(12) United States Patent
Oohashi et al.

(10) Patent No.: US 7,753,306 B2
(45) Date of Patent: Jul. 13, 2010

(54) WINDING MACHINE FOR ROTOR AND METHOD OF FABRICATING ROTOR

(75) Inventors: Yasushi Oohashi, Kariya (JP); Mituyuki Hayashi, Nishio (JP)

(73) Assignee: Denso Corporation, Kariya (JP)

( * ) Notice: Subject to any disclaimer, the term of this patent is extended or adjusted under 35 U.S.C. 154(b) by 71 days.

(21) Appl. No.: 12/148,666

(22) Filed: Apr. 21, 2008

(65) Prior Publication Data

US 2008/0265083 A1  Oct. 30, 2008

(30) Foreign Application Priority Data

Apr. 26, 2007  (JP) .............................. 2007-117095

(51) Int. Cl.
*H02K 15/09* (2006.01)
(52) U.S. Cl. .................. 242/433.3; 242/433.4
(58) Field of Classification Search ................ 242/433, 242/433.3, 433.4, 432.3, 432.6
See application file for complete search history.

(56) References Cited

U.S. PATENT DOCUMENTS

| | | | | |
|---|---|---|---|---|
| 4,786,004 A | * | 11/1988 | Boers | 242/433.4 |
| 6,079,659 A | * | 6/2000 | Yamamura et al. | 242/433.2 |
| 6,217,248 B1 | * | 4/2001 | Reiff | 403/24 |
| 6,343,762 B1 | | 2/2002 | Stratico et al. | |
| 6,349,895 B1 | * | 2/2002 | Becherucci et al. | 242/433.3 |
| 6,568,622 B2 | * | 5/2003 | Hiei | 242/433.3 |
| 6,749,145 B2 | * | 6/2004 | Higashi et al. | 242/433.4 |
| 7,267,296 B2 | * | 9/2007 | Ponzio et al. | 242/433.3 |
| 2002/0003185 A1 | * | 1/2002 | Hiei | 242/433.3 |
| 2002/0017585 A1 | * | 2/2002 | Haruta et al. | 242/433.3 |

FOREIGN PATENT DOCUMENTS

| | | |
|---|---|---|
| JP | 08-033291 | 2/1996 |
| JP | 08-214511 | 8/1996 |

OTHER PUBLICATIONS

Office Action dated Dec. 16, 2008 in Japanese Application No. 2007-117095.
Office Action dated Feb. 4, 2010 in Germany Application No. 10 2008 020 357.2-32.

* cited by examiner

*Primary Examiner*—Evan H Langdon
(74) *Attorney, Agent, or Firm*—Harness, Dickey & Pierce, PLC

(57) ABSTRACT

A winding machine includes flyers 5 rotated around a flyer rotation axis AXf orthogonal to the axis AXs of a rotor 2 constituting a work while at the same time winding wires 6 on core 23 of rotor 2. Rotor 2 is set in the winding machine in such a position that the center position of core 23 in the direction along rotor axis AXs and flyer rotation axis AXf are displaced from each other.

3 Claims, 5 Drawing Sheets

WINDING MACHINE FOR ROTOR AND METHOD OF FABRICATING ROTOR

BACKGROUND OF THE INVENTION

1. Field of the Invention

This invention relates to a winding machine for a rotor of, for example, an electric motor and a method of fabricating the rotor.

2. Description of the Related Art

A winding machine having a flyer for winding a wire on the core of a rotor is disclosed in, for example, Japanese Unexamined Patent Publication No. 8-33291. In the winding machine of this type, as understood from schematic perspective view FIG. 6 showing a flyer 105 and a rotor 102, flyer 105 is rotated around a flyer rotation axis AXf orthogonal to a rotor axis AXs, while at the same time supplying a wire 106 from a nozzle arranged at the forward end of flyer 105, and wire 106 is guided to a plurality of predetermined slots (not shown) formed on the rotor core of rotor by a guide unit 104 so that the wire is wound along a path including the slots.

FIG. 7 is a side view schematically showing the state in which rotor 102 having a commutator 124 is set in a conventional winding machine, and in which flyer rotation axis AXf and a circular track T at the forward end of the flyer are also shown. In a conventional winding machine, as shown in FIG. 7, the position of flyer rotation axis AXf coincides with a center line CL along an axial length L of a rotor core 123.

FIG. 8 is a sectional plan view taken in the plane containing rotor axis AXs of the essential parts of a conventional winding machine with rotor 102 having a commutator 124 set in position. A shaft 121a on the side having commutator 124 is chucked by a chuck unit 131 of a holding unit of the winding machine thereby fixing rotor 102 to the winding machine. Chuck unit 131 has the function of not only fixing rotor 102, but also covering commutator 124, and has a cylindrical contour with a tapered forward end to avoid interference with the wire at the time of the winding operation (in this specification, the "chuck unit" is also referred to as the "commutator cover"). The winding machine shown in FIG. 8 has, though not shown, a pair of flyers symmetric about rotor axis AXs. The wires (not shown) supplied from the flyer pair are guided by two guide units 104 arranged on the two sides of core 123 of the rotor to predetermined slots (not shown) of core 123.

In view of the fact that the wire is also wound on the end surfaces of the core, the core and the commutator are arranged at a predetermined interval with each other. Generally, a winding operation is easy for a rotor with a wide interval. However, in the case where the interval of the rotor is narrow, the wire may be damaged by interference with the commutator cover. In the case where the interval is narrower, the gaps designated by reference numerals 110 between commutator cover 131 and guide units 104 in FIG. 8 are further reduced, thereby posing the problem that the wire is stagnated in gaps 110 and cannot be guided to the slots.

SUMMARY OF THE INVENTION

This invention has been achieved in view of the problem of the prior art described above, and the object thereof is to provide a winding machine having a smaller space adjacent to the end portions of the rotor core required for the winding operation of the rotor and a method of fabricating the rotor.

According to this invention, as a technical means for achieving the object described above, there is provided a winding machine or a rotor fabrication method described in each of the appended claims.

According to the invention, there is provided a winding machine comprising flyers (5) rotated around a flyer rotation axis (AXf) orthogonal to a rotor axis (AXs) of a rotor (2) constituting a work while winding wires (6) on a core (23) of rotor (2), wherein rotor (2) is set on the winding machine in such a manner that the center position of core (23) in the direction along rotor axis (AXs) and flyer rotation axis (AXf) are displaced from each other. As a result, the circular track of flyers (5) can be shifted in the direction having a spatial margin, and therefore the effect of an obstacle such as a commutator cover adjacent to rotor core (23) that may have on wires (6) being wounded can be reduced. Further, the space adjacent to the end portions of rotor core (23) required for the winding operation on rotor (2) can be reduced.

According to the invention, there is provided the winding machine of claim 1, wherein a rotor (2) having a commutator (24) arranged in spaced relation with a core (23) along the direction of a rotor axis (AXs) constitutes a work, wherein with rotor (2) set in the winding machine, a flyer rotation axis (AXf) is displaced from the center position of core (23) in the direction away from commutator (24). The circular track of flyers (5) is displaced in the direction away from commutator (24), and therefore the spatial effect that commutator (24) or the commutator cover has on wires (6) being wound is reduced.

According to the invention, there is provided a rotor fabrication method using flyers (5) rotated around a flyer rotation axis (AXf) orthogonal to a rotor axis (AXs) of a rotor (2) constituting a work, wherein flyers (5) are rotated around flyer rotation axis (AXf) displaced from the center position of core (23) of rotor (2) in the direction along rotor axis (AXs) while at the same time winding wires (6) on core (23). In this configuration, the circular track of flyers (5) can be shifted in the direction having a spatial margin, with the result that the effect that an obstacle such as a commutator cover adjoining core (23) of rotor (2) may have on wires (6) being wound can be reduced, or the space adjoining the end portions of rotor core (23) of rotor (2) required for the winding operation can be reduced.

According to the invention, there is provided the rotor fabrication method wherein rotor (2) having commutator (24) arranged in spaced relation with core (23) in the direction along rotor axis (AXs) constitutes a work, wherein flyers (5) are rotated around flyer rotation axis (AXf) displaced from the center position of core (23) in the direction away from commutator (24). The circular track of flyers (5) is shifted in the direction away from commutator (24), and therefore the spatial effect that commutator (24) or the commutator cover has on wires (6) being wound is reduced.

The reference numerals inserted in the parentheses following the names of each means described above represent an example of correspondence with specific means described later in embodiments.

The present invention may be more fully understood from the description of preferred embodiments of the invention as set forth below, together with the accompanying drawings.

DESCRIPTION OF THE PREFERRED EMBODIMENTS

Figure 1:
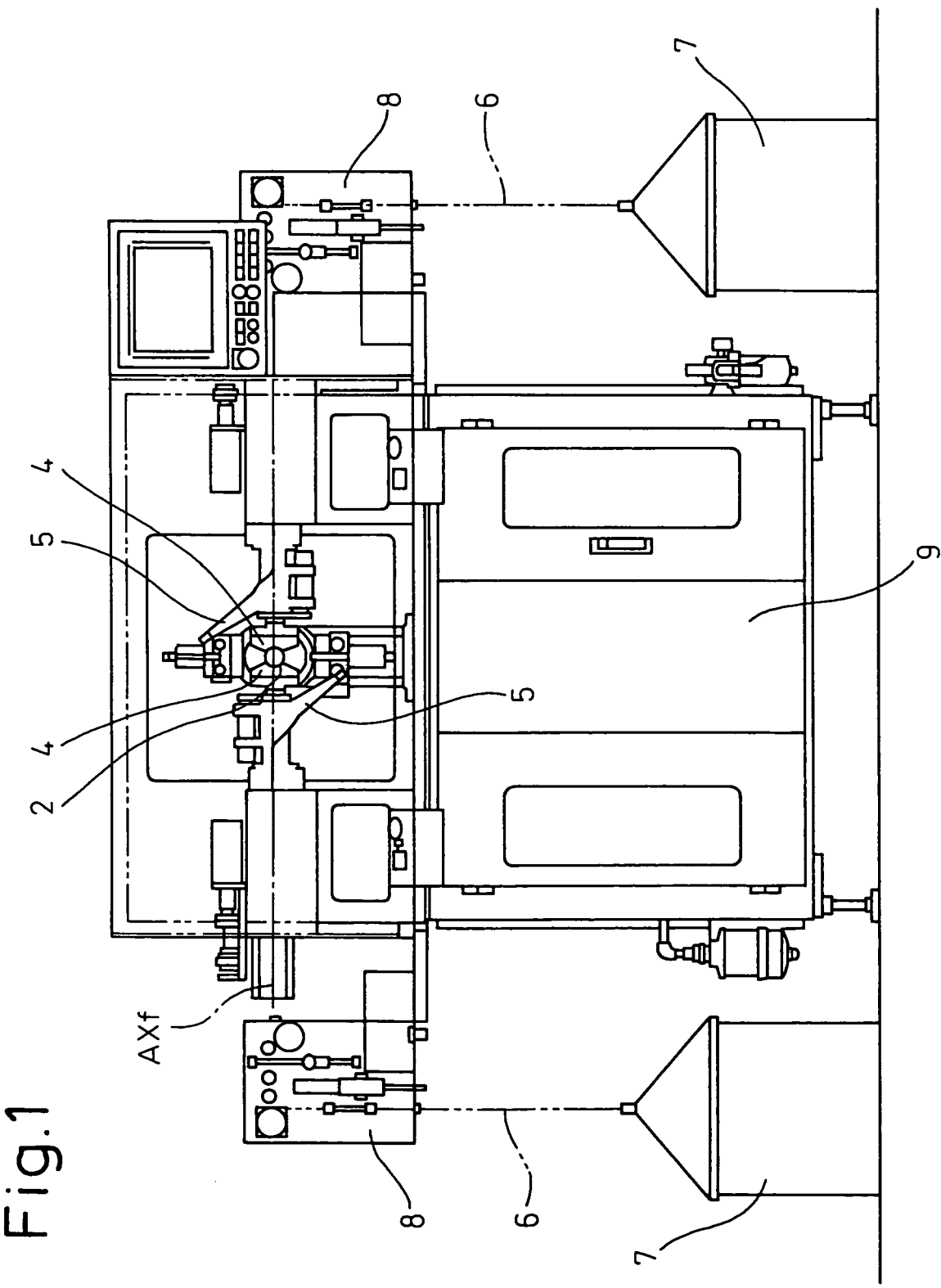
FIG. 1 is a front view of a winding machine according to an embodiment of the invention.
Figure 2:
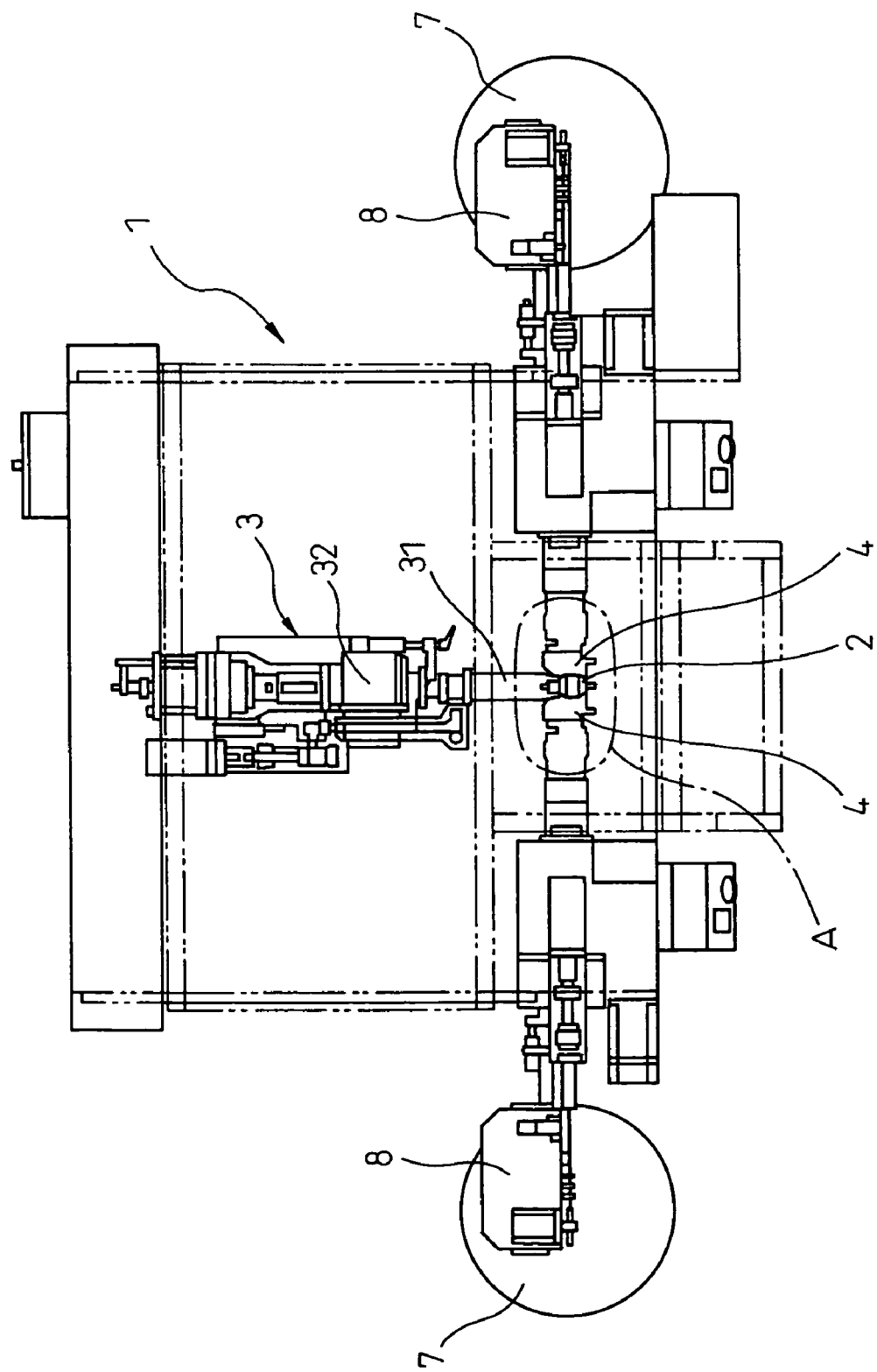
FIG. 2 is a plan view of the winding machine shown in FIG. 1.
Figure 3:
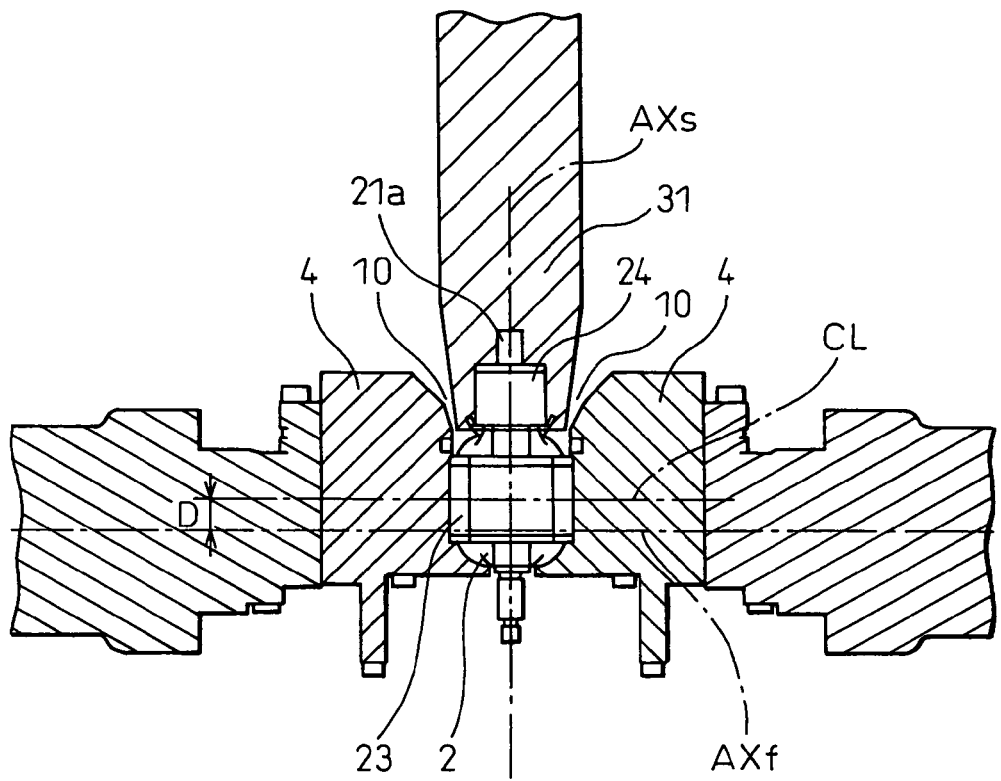
FIG. 3 is an enlarged sectional plan view of the essential parts of the winding machine shown in FIG. 2.

A preferred embodiment of the invention will be explained below with reference to the drawings. FIGS. 1 and 2 are a front view and a plan view, respectively, of a winding machine according to an embodiment of the invention. FIG. 3 is an enlarged sectional plan view, taken in the plane containing a rotor axis AXs, of the essential parts shown in the area A of FIG. 2. The winding machine according to this embodiment includes a holding unit 3 for holding a rotor 2 constituting a work, guide units 4 for guiding wires 6 to the slots formed on a core 23 of rotor 2, flyers 5 for winding wires 6 on core 23 of rotor 2, coil pack units 7 for supplying wires 6, tensioning units 8 for applying a predetermined tension to the wires, a base unit 9 and a wire end chuck (not shown) for holding the first end of wires 6. Guide units 4, flyers 5, coil pack units 7 and tensioning units 8 are each provided in a symmetric pair. Therefore, in the winding machine according to this embodiment, two wires 6 or two wire bundles 6 can be wound at the same time on rotor 2.

Figure 4:
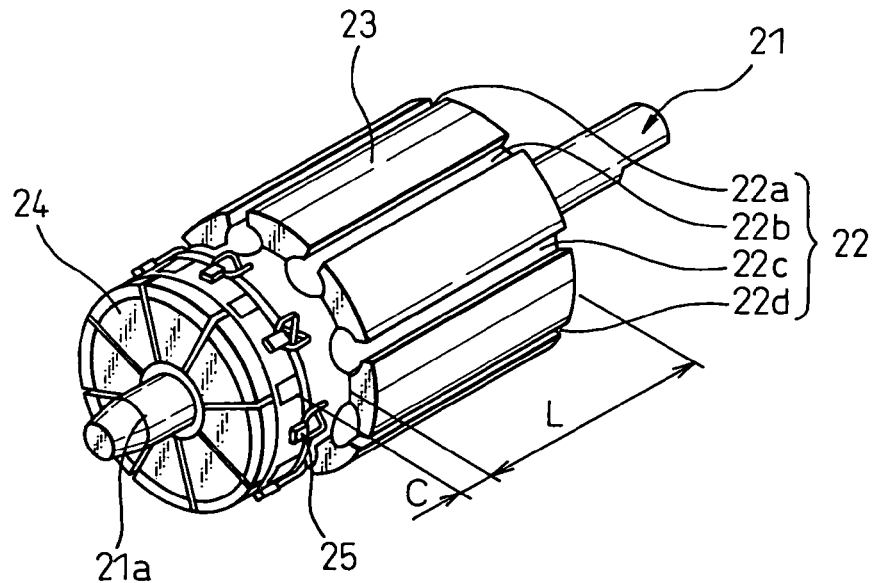
FIG. 4 is a perspective view of the rotor on which the winding operation is to be performed.

Before explaining the winding machine, rotor 2 constituting a work will be explained. FIG. 4 shows rotor 2 to be processed by the winding machine according to this embodiment. This rotor 2 includes a shaft 21, a substantially cylindrical core 23 formed with eight slots 22 in the axial direction, and a substantially cylindrical commutator 24 mounted on shaft 21 and smaller in diameter than core 23. Core 23 has an axial length of L and spaced from commutator 24 with an interval C. Commutator 24 has as many coil hooks 25 as slots 22, and a turn of wires 6 is held on coil hooks 25. The wires wound between slots 22 are not shown in FIG. 4. However, with rotor 2 according to this embodiment, each pair of alternate slots 22 such as slots 22a, 22c or slots 22b, 22d shown in FIG. 4 is wound.

Returning to FIGS. 1 and 3, the winding machine according to this embodiment will be explained. Flyers 5 of the winding machine are rotated around a common flyer rotation axis AXf orthogonal to rotor axis AXs, with the result that the forward end of each flyer 5 revolves along a circular track in the plane orthogonal to flyer rotation axis AXf. With the revolution of the forward end of each flyer 5, wires 6 are pulled out from the forward end thereof, and wires 6 thus pulled out are guided by guide units 4 to a set of slots 22a, 22c to be wound. Guide units 4 are formed in a block member having slopes to guide wires 6 to slots 22 and each arranged inside the circular track at the forward end of each flyer 5. Guide units 4 are formed in a way adapted to be advanced or retracted in the direction parallel to flyer rotation axis AXf.

Holding unit 3 is configured to fix rotor 2 onto the winding machine by chucking a shaft end portion 21a of rotor 2 nearer to the commutator on the one hand and can rotate the chucked shaft 21 by a predetermined angle so that slots 22 to be wound are arranged in the winding position on the other hand. For this reason, holding unit 3 includes a chuck unit 31 for chucking shaft 21 of rotor 2 and a drive unit 32 for advancing, retreating, rotating and activating chuck unit 31. Chuck unit 31 is formed not only to chuck shaft end portion 21, but also to cover commutator 24. Therefore, in this specification, chuck unit 31 is also called a "commutator cover 31". The contour of commutator cover 31 is formed as a cylinder with a tapered forward end to prevent wires 6 from interfering with commutator cover 31 during the winding operation.

Figure 5:
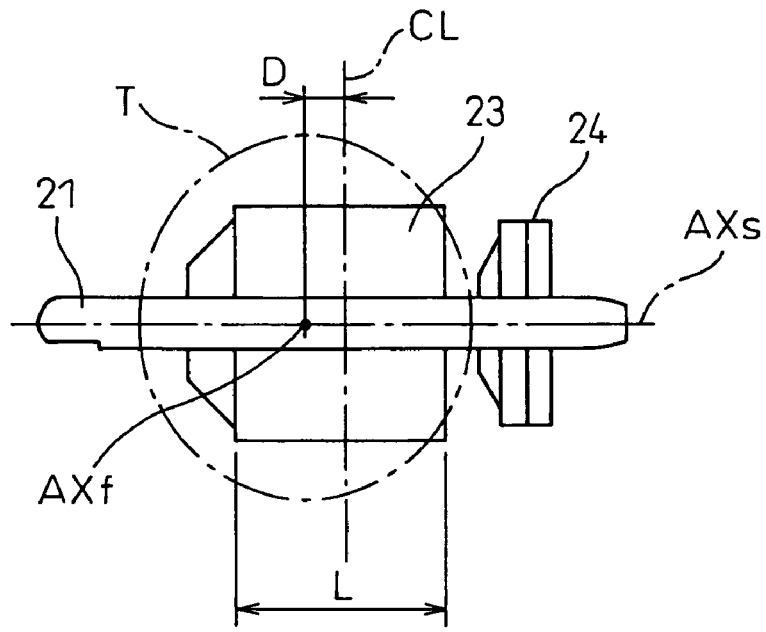
FIG. 5 is a side view schematically showing the relationship between the flyer rotation axis of the winding machine described above and the rotor.
Figure 6:
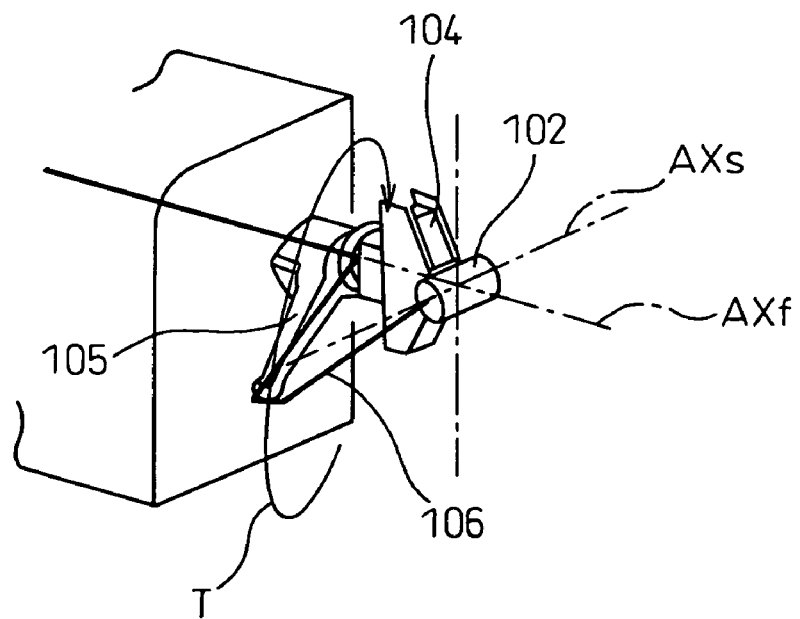
FIG. 6 is a perspective view schematically showing the essential parts of the conventional winding machine.
Figure 7:
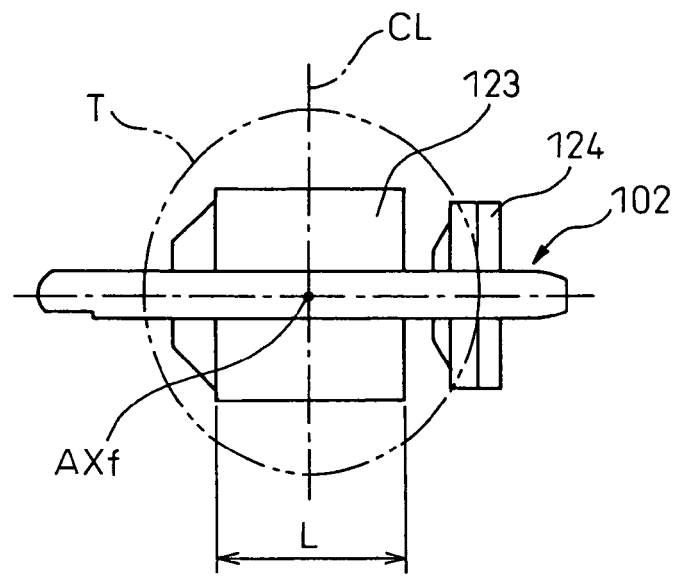
FIG. 7 is a side view schematically showing the relation between the flyer rotation axis of the conventional winding machine and the rotor.
Figure 8:
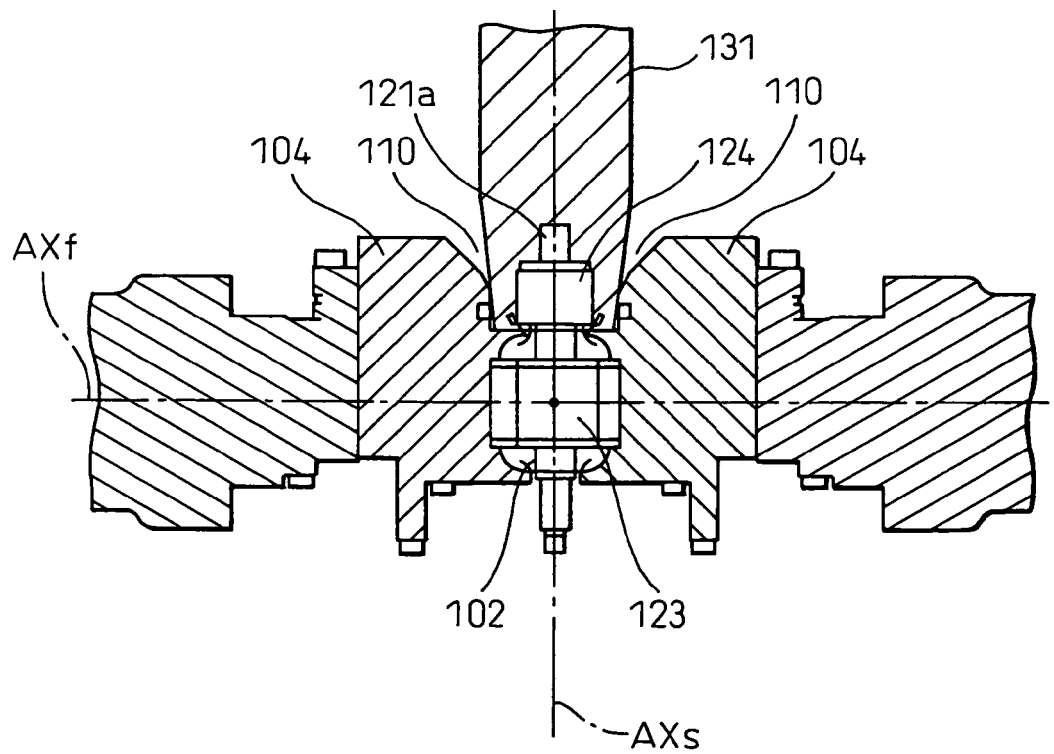
FIG. 8 is a sectional plan view of the essential parts of the conventional winding machine.

The relationship between the rotor and the flyers will be explained with reference to FIGS. 3 and 5. FIG. 5 is a side view schematically showing flyer rotation axis AXf and circular track T at the forward end of the flyers with rotor 2 set in the winding machine. As shown in FIGS. 3 and 5, according to the invention, with rotor 2 set in the winding machine, flyer rotation axis AXf and center line CL of total length L of core 23 of rotor 2 are not overlapped but displaced from each other. Especially, according to this embodiment, flyer rotation axis AXf is displaced a distance D from center line CL away from commutator 24. With this arrangement of rotor 2 in the winding machine, as shown in FIG. 3, triangular gaps 10 formed between commutator cover 31 and guide units 4 are enlarged as compared with the conventional machine shown in FIG. 7, i.e. as compared with the machine in which flyer rotation axis AXf and the center line of core 23 are overlapped with each other. As a result, wires 6 to be guided to slots 22 are accurately wound on core 23 without stagnating in gaps 10 or interfering with commutator cover 31.

A rotor fabrication method according to the invention will be explained with reference to FIGS. 3 and 5. This fabrication method is implemented using flyers 5 rotated around flyer rotation axis AXf orthogonal to rotor axis AXs of rotor 2 constituting a work. In the rotor fabrication method according to this invention, flyer rotation axis AXf is displaced a distance D from the center position of core 23 away from commutator 24 along rotor axis AXs. In the process of winding the wires on core 23, the flyers are rotated around flyer rotation axis AXf displaced from the center position of core 23 as described above.

According to the aforementioned embodiment, rotor 2 has commutator 24, and flyer rotation axis AXf is displaced from the center position of core 23 in the direction away from commutator 24 of rotor 2. Nevertheless, according to this invention, a rotor having no commutator may be used as a work. In the case where a chucking or a clamping device for fixing the rotor having no commutator is located in proximity to the core, for example, flyer rotation axis AXf may be displaced from the center position of the core in the direction away from the chucking device or the clamping device, as the case may be.

While the invention has been described by reference to specific embodiments chosen for purposes of illustration, it should be apparent that numerous modifications could be made thereto by those skilled in the art without departing from the basic concept and scope of the invention.

The invention claimed is:

1. A winding machine comprising flyers rotated around a flyer rotation axis orthogonal to an axis of a rotor constituting a work while at the same time winding wires on a core of the rotor, wherein the rotor is set in the winding machine such that a center position of the core along the rotor axis and the flyer rotation axis are displaced from each other;

wherein the rotor has a commutator arranged in spaced relation with the core in a direction along the rotor axis and wherein with the rotor set in the winding machine, the flyer rotation axis is displaced from the center position of the core along the rotor axis in a direction away from the commutator.

2. A winding machine for a rotor as a work including a shaft, a substantially cylindrical core formed with a plurality of slots and a substantially cylindrical commutator arranged at one end portion of the shaft in spaced relation with the core along an axis of the shaft, comprising:

- a pair of flyers arranged symmetrically about a longitudinal axis of the winding machine coincident with a rotor axis of the rotor set in the winding machine, the flyers being rotated around a flyer rotation axis orthogonal to the longitudinal axis while at the same time winding wires supplied from a forward end of each flyer on the core of the rotor;
- a chuck unit having a substantially cylindrical contour with a tapered forward end and aligned with the longitudinal axis of the winding machine for chucking the one end portion of the shaft of the rotor while at the same time covering to protect the commutator from the wires supplied from the forward end of the flyers; and
- a pair of guide units arranged symmetrically about the longitudinal axis and each having slopes formed in such a manner as to guide the wires to the slots of the core;

wherein substantially triangular gaps adapted to pass the wires supplied from the flyers are formed between the tapered forward end of the chuck unit and one of the slopes of each guide unit as viewed in a section taken along a plane containing the longitudinal axis and the flyer rotation axis of the winding machine; and wherein with the rotor set in the winding machine, the flyer rotation axis is disposed from a center position of the core along the rotor axis in a direction away from the commutator.

3. A rotor fabrication method using flyers rotated around a flyer rotation axis orthogonal to an axis of a rotor constituting a work, the method comprising,

- winding wires on the core by rotating the flyers around the flyer rotation axis displaced from a center position of the core of the rotor in the direction along the rotor axis;
- wherein the rotor has a commutator arranged in spaced relation with the core in a direction along the rotor axis, and
- wherein the flyers are rotated around the flyer rotation axis, the flyer rotation axis being displaced from the center position of the core along the rotor axis in a direction away from the commutator.

* * * * *